United States Patent Office 3,190,855
Patented June 22, 1965

3,190,855
WATER-SOLUBLE STEROIDS AND A METHOD
FOR PREPARING THE SAME
Takuichi Miki, Hyogo, Japan, assignor to Takeda
Chemical Industries, Ltd., Osaka, Japan
No Drawing. Filed Aug. 30, 1962, Ser. No. 220,565
9 Claims. (Cl. 260—63)

The present invention relates to novel water-soluble derivatives of steroids and to a method for preparing same. These water-soluble derivatives of steroids are esters of hydroxy-steroids with various vinylpyrrolidone co-polymers having in their polymer-chains carboxyl groups or reactive groups derived therefrom.

The invention is concerned with means for solubilizing difficultly-soluble substances, especially steroids, and is based on the following findings according to this invention.

I. Hydroxy-steroids can form esters with vinylpyrrolidone co-polymers having in their polymer chains carboxyl groups or reactive groups derived therefrom,
II. So-formed esters have among others the properties given below:
  (i) Easily soluble in water.
  (ii) Biological effect lasts longer than the corresponding difficultly-soluble steroids.
  (iii) Low toxicity.

The novel esters of the present invention are characterized inter alia by a therapeutically useful anti-inflammatory activity which makes them effective as anti-phlogistics in the treatment of e.g. inflamed joints and the like. Administration may e.g. be conveniently effected by topical application of the said esters to affected parts, the esters being for this purpose homogeneously distributed in a conventional ointment or cream base, the ointment or cream being rubbed into the inflamed areas. Due to the ease of solution in water, the esters may also be applied in the form of an aqueous liniment; or the aqueous solutions may be injected into the afflicted parts. Oral administration is also possible and effective.

One of such esters, for example, that of prednisolone with vinylpyrrolidone-maleic anhydride co-polymer shows a distinct and long-lasting anti-inflammatory effect in comparison with prednisolone itself; and similarly, the ester of 9α-fluoro-16α-methyl-prednisolone (hereinafter referred to as dexamethasone) with vinylpyrrolidone-maleic anhydride co-polymer has superior anti-inflammatory effect to that of dexamethasone; and the other esters of the present invention show similar superiority to the difficultly-soluble steroids from which the esters are derived.

An object of the present invention is to provide water-soluble steroid derivatives having the above-enumerated properties, and also a method for producing the same. These objects are realized by reacting hydroxy-steroids with vinylpyrrolidone co-polymers having carboxyl groups or reactive groups derived therefrom to form esters composed of steroids and vinylpyrrolidone co-polymers.

The starting steroids of the present invention should have at least one hydroxyl group at any position of the steroid, for example, at the 3-position, 16-position, 17-position, 19-position, 21-position, etc., such for example as adrenal cortical hormone, anabolic hormone, male hormone or female hormone. The hydroxy-steroids may have other substituents than the hydroxyl group, as long as these substituents do not obstruct the esterification. Further, the starting steroid may be dehydrogenated at any position or positions, e.g. 1, 2; 3, 4; 5, 10; 4, 5; 6, 7; 16, 17; etc. Examples of such steroids are, for example, estrane series steroids such as estradiol, estrone, ethyl-estradiol, 17-desoxyestrone, equilenin, 17-dihydroequilenin, 19-nortestosterone, 19-norcortisone, etc., androstane and pregnane series steroids such as testosterone, androsterone, dihydrotestosterone, dihydroandrosterone, cortisone, prednisolone, hydrocortisone, triamcinolone, dexamethasone, 2-hydroxyprogesterone, androstane-3,17-diol, $\Delta^5$-androstene-3,17-diol, pregnane-3,20-diol, pregnane-3,16,20-triol, etc.

Vinylpyrrolidone co-polymer employed in the present invention preferably has a molecular weight of from 2000 to 70,000. When the molecular weight of the vinylpyrrolidone co-polymer is lower than 2000, the ester compound composed of the steroid and vinylpyrrolidone co-polymer is too readily excreted from the living body. Therefore, the desired long-lasting effect cannot be accomplished therewith. On the other hand, when the molecular weight of the vinylpyrrolidone co-polymer exceeds 70,000, the ester compound cannot be easily excreted from the body, because such an ester can hardly pass through cell-membrane.

Vinylpyrrolidone co-polymer is easily prepared according to the general method for preparing vinyl series co-polymer, by subjecting vinylpyrrolidone to the co-polymerization reaction with vinyl monomer having reactive groups derived from the carboxyl group. As vinyl monomer, there may, for example, be used a carboxylic acid such as acrylic acid, etc., an acid anhydride such as maleic anhydride, an acid halide such as acrylic acid chloride, etc., an acid ester such as acrylic acid methyl ester, etc. Generally, the vinylpyrrolidone co-polymer employed in the present invention is prepared from 1 part by weight of vinyl monomer and 1 to 5 parts by weight of vinylpyrrolidone.

Reactive groups derived from carboxyl groups are e.g. acid anhydride group, halogenocarbonyl group, for example chlorocarbonyl, lower alkoxycarbonyl group, for example ethoxycarbonyl, etc.

Esterification required for producing the compounds of the present invention may be carried out in accordance with per se conventional means. For example, for the esterification of steroid with vinylpyrrolidone co-polymers having carboxyl groups in the polymer-chains, the reaction may preferably be conducted with the aid of a dehydrating catalyst such as sulfuric acid, organic sulfonic acid, metal oxide, etc. For the esterification of steroid with co-polymers containing acid halide groups, the reaction may be conducted in the presence of a deacidifying agent. As the deacidifying agent, there may, for example, be used alkali such as sodium hydroxide, potassium hydroxide, etc., or organic basic materials such as pyridine, picoline, dimethylformamide, collidine, etc. The esterification of steroid and co-polymers having an ester group may preferably be conducted in the presence of alkali alcoholate such as sodium alcoholate, potassium alcoholate, etc.

Generally, the most desirable ratio of the steroid and vinylpyrrolidone for converting the steroid into water-soluble compound is one part by weight of steroid to 1 to 40 parts by weight of vinylpyrrolidone. The esterification is in general accelerated by heating at about 100° C. If necessary, the conversion may be carried out at a higher or lower temperature than the above mentioned temperature. The esterification may be conducted in the presence or absence of a suitable solvent such as pyridine, dimethylformamide, colidine, dimethylsulfoxide. The solvent may be distilled off after the reaction and the ester obtained may be washed with alcohol, benzene, ethyl acetate or hexane.

The present invention is described in further particularity by means of the following examples. It will be, of course, understood that the invention is not limited to the particular details of these examples since they only set forth presently preferred exemplary embodiments of the invention. In these examples, the relation between part by weight and part by volume is the same as that between gram and milliliter, and the abbreviations "E," "mμ," "max.," "mg." and "cc." are respectively "extinction," "millimicrons," "maximum," "milligrams" and "cubic centimeters."

Example 1

To a solution of 10 parts by weight of vinylpyrrolidone-maleic anhydride co-polymer (1:1) (U.S. Pat. No. 2,676,949) in 50 parts by volume of pyridine, is added 10 parts by weight of prednisolone. The solution is heated on a water-bath for one hour. Then the pyridine is distilled off under reduced pressure. The residue is mixed with benzene, ground up thoroughly and then filtered. It is then suspended in alcohol, and further a small amount of sodium alcoholate is added to liberate the remaining pyridine; then the so-obtained precipitate is filtered. The product is washed with alcohol and ethylacetate to obtain 16 parts by weight of sodium salt of ester composed of prednisolone and the co-polymer as fine powder. The product is easily soluble in water. The ester contains about 20% of prednisolone.

$$\lambda_{max.}^{H_2O} = 247 \text{ m}\mu \quad E_{1\text{ cm.}}^{1\%} = 98$$

Example 2

To a solution of 8 parts by weight of vinylpyrrolidone-maleic anhydride co-polymer (1:1) in 50 parts by volume of pyridine is added 2 parts by weight of dexamethasone, while heating on a water-bath for 30 minutes. Then the solution is treated in the same way as in Example 1 to obtain sodium salt of an ester composed of dexamethasone and the co-polymer as fine powder. The yield is 7.2 parts by weight. The ester contains about 16% of dexamethasone.

$$\lambda_{max.}^{H_2O} = 240 \text{ m}\mu \quad E_{1\text{ cm.}}^{1\%} = 64$$

Example 3

To a solution of 2 parts by weight of vinylpyrrolidone-maleic anhydride co-polymer (1:1) in 25 parts by volume of pyridine, is added 2 parts by weight of 17α,19,21-trihydroxypregn-4-ene-3,20-dione, while heating on a water-bath for 30 minutes. The solution is treated in the same way as in Example 1 to obtain sodium salt of an ester composed of 17α,19,21-trihydroxypregn-4-ene-3,20-dione and the co-polymer as fine powder. The yield is 3.8 parts by weight. The product, soluble in water, contains about 22% of 17α,19,21-trihydroxypregn-4-ene-3,20-dione.

$$\lambda_{max.}^{H_2O} = 247 \text{ m}\mu \quad E_{1\text{ cm.}}^{1\%} = 92$$

Example 4

Eight parts by weight of vinylpyrrolidone-maleic anhydride co-polymer (1:1) are dissolved in 32 parts by volume of pyridine with heating. To the solution is added 1.6 parts by weight of prednisolone and the solution is heated for 30 minutes. Then the pyridine is distilled off under reduced pressure, followed by the addition of benzene with stirring to obtain a powdery substance. This is suspended in alcohol, and further a small amount of potassium alcoholate is added to liberate the remaining pyridine, the so-obtained precipitate being then filtered. The product is washed with alcohol and ethylacetate to obtain potassium salt of an ester composed of prednisolone and the co-polymer as fine powder. The product is soluble in water clearly. The yield is 8.8 parts by weight. It contains about 7% of prednisolone.

$$\lambda_{max.}^{H_2O} = 257 \text{ m}\mu \quad E_{1\text{ cm.}}^{1\%} = 44.8$$

Example 5

Four parts by weight of vinylpyrrolidone-maleic anhydride co-polymer (1:1) are dissolved in 6 parts by volume of pyridine and 6 parts by volume of dimethylformamide with heating. To the solution is added 1.5 parts by volume of prednisolone while heating on a water-bath for 20 minutes. Then the solvent is distilled off under reduced pressure, followed by the addition of acetone with stirring to obtain a powdery substance. The powdery substance is suspended in alcohol and then a small amount of sodium alcoholate is added to remove the remaining pyridine, the so-obtained precipitate being then filtered. The product was washed with alcohol to obtain sodium salt of an ester composed of prednisolone and the co-polymer as fine powder. The product is soluble in water clearly. The yield is 5 parts by weight. About 8% of prednisolone is contained in the ester.

$$\lambda_{max.}^{H_2O} = 247 \text{ m}\mu \quad E_{1\text{ cm.}}^{1\%} = 49$$

Example 6

In 50 parts by volume of pyridine are dissolved 2.1 parts by weight of vinylpyrrolidone-maleic anhydride co-polymer (1:1) and 2.9 parts by weight of testosterone, with heating. The solution is treated in the same way as in Example 1 to obtain sodium salt of an ester composed of testosterone and the co-polymer as fine powder. The product is soluble in water. The yield is 2.3 parts by weight. There is about 5% of testosterone in the ester.

$$\lambda_{max.}^{H_2O} = 244 \text{ m}\mu \quad E_{1\text{ cm.}}^{1\%} = 41$$

Example 7

To 50 parts by volume of pyridine are added 10 parts by weight of vinylpyrrolidone-maleic anhydride co-polymer (1:1) and 10 parts by weight of hydrocortisone with heating. The solution is treated in the same way as in Example 1 to obtain sodium salt of an ester composed of hydrocortisone and the co-polymer as fine powder. The product is soluble in water. The yield is 3.0 parts by weight. The ester contains about 23% of hydrocortisone.

$$\lambda_{max.}^{H_2O} = 246 \text{ m}\mu \quad E_{1\text{ cm.}}^{1\%} = 118$$

Example 8

Ten parts by weight of vinylpyrrolidone-maleic anhydride co-polymer (1:1) and eight parts by weight of cortisone are dissolved in pyridine. The solution is treated in the same way as in Example 1 to obtain sodium salt of an ester composed of cortisone and the co-polymer as fine powder. The product is soluble in water. The yield is 12.5 parts by weight. There is 20% of cortisone in the ester.

$$\lambda_{max.}^{H_2O} = 246 \text{ m}\mu \quad E_{1\text{ cm.}}^{1\%} = 96$$

Example 9

Two parts by weight of vinylpyrrolidone-maleic anhydride co-polymer (1:1) and two parts by weight of triamcinolone are dissolved in pyridine. The solution is treated in the same way as in Example 1 to obtain sodium salt of an ester composed of triamcinolone and the co-polymer. The yield is 2.62 parts by weight. The ester contains 24% of triamcinolone.

$$\lambda_{max.}^{H_2O} = 240 \text{ m}\mu \quad E_{1\text{ cm.}}^{1\%} = 112$$

Example 10

One part by weight of vinylpyrrolidone-maleic anhydride co-polymer (1:1) and 0.5 part by weight of 19-nortestosterone are dissolved in pyridine. The solution is treated in the same way as in Example 1 to obtain sodium salt of an ester composed of 19-nortestosterone and the co-polymer. The yield is 1.06 parts by weight. The ester contains about 3% of 19-nortestosterone.

$$\lambda_{max.}^{H_2O} = 244 \text{ m}\mu \quad E_{1\text{ cm.}}^{1\%} = 33.8$$

Example 11

Five parts by weight of vinylpyrrolidone-maleic anhydride co-polymer (1:1) and five parts by weight of estradiol are dissolved in pyridine. The solution is treated in the same way as in Example 1 to obtain an ester composed of estradiol and the co-polymer as fine powder. The yield is 6.0 parts by weight. The ester contains about 17% of estradiol.

$$\lambda_{\max.}^{H_2O} = 285 \text{ m}\mu \qquad E_{1 \text{ cm.}}^{1\%} = 33$$

Having thus disclosed the invention, what is claimed is:

1. 21-monoester of prednisolone with a copolymer of 1 to 5 parts by weight of vinylpyrrolidone and 1 part by weight of maleic anhydride, the copolymer having a molecular weight of from 2000 to 70,000.

2. 21-monoester of cortisone with a copolymer of 1 to 5 parts by weight of vinylpyrrolidone and 1 part by weight of maleic anhydride, the copolymer having a molecular weight of from 2000 to 70,000.

3. 21-monoester of hydrocortisone with a copolymer of 1 to 5 parts by weight of vinylpyrrolidone and 1 part by weight of maleic anhydride, the copolymer having a molecular weight of from 2000 to 70,000.

4. 21-monoester of 9α-fluoro-16α-methyl-prednisolone with a copolymer of 1 to 5 parts by weight of vinylpyrrolidone and 1 part by weight of maleic anhydride, the copolymer having a molecular weight of from 2000 to 70,000.

5. An ester of testosterone with a copolymer of 1 to 5 parts by weight of vinylpyrrolidone and 1 part by weight of maleic anhydride, the copolymer having a molecular weight of from 2000 to 70,000.

6. An ester of 19-nortestosterone with a copolymer of 1 to 5 parts by weight of vinylpyrrolidone and 1 part by weight of maleic anhydride, the copolymer having a molecular weight of from 2000 to 70,000.

7. 16,21-diester of triamcinolone with a copolymer of 1 to 5 parts by weight of vinylpyrrolidone and 1 part by weight of maleic anhydride, the copolymer having a molecular weight of from 2000 to 70,000.

8. 3,17-diester of estradiol with a copolymer of 1 to 5 parts by weight of vinylpyrrolidone and 1 part by weight of maleic anhydride, the copolymer having a molecular weight of from 2000 to 70,000.

9. The method of rendering difficultly water-soluble hydroxy-steroid readily water-soluble which comprises incorporating a vinylpyrrolidone-maleic anhydride copolymer moiety into the molecule thereof by reacting the hydroxy-steroid with vinylpyrrolidone-maleic anhydride copolymer, having a molecular weight of from 2000 to 70,000 and being a copolymer of 1 to 5 parts by weight of vinylpyrrolidone and 1 part by weight of maleic anhydride.

No references cited.

LEWIS GOTTS, *Primary Examiner.*